United States Patent [19]

Shirtum et al.

[11] Patent Number: 5,310,955

[45] Date of Patent: May 10, 1994

[54] VERTICAL CONTINUOUS REACTOR AND PROCESS FOR LIQUID EPOXY RESIN

[75] Inventors: Robert P. Shirtum, Freeport; Walter L. Wernli, Angleton; David D. McCoy, Lake Jackson, all of Tex.

[73] Assignee: The Dow Chemical Company, Midland, Mich.

[21] Appl. No.: 107,400

[22] Filed: Aug. 16, 1993

Related U.S. Application Data

[62] Division of Ser. No. 643,877, Jan. 18, 1991, abandoned.

[51] Int. Cl.⁵ .................. C07D 301/28; C07D 303/27; B28C 5/00; B01J 8/04
[52] U.S. Cl. .................... 549/517; 366/15; 366/279; 422/134; 422/135; 422/191; 422/224; 422/225; 422/229
[58] Field of Search ......................... 549/517

[56] References Cited

U.S. PATENT DOCUMENTS

| | | |
|---|---|---|
| 1,672,016 | 6/1928 | Williams et al. . |
| 2,582,899 | 1/1952 | Barnebey et al. . |
| 2,644,009 | 6/1953 | Cash et al. . |
| 2,727,882 | 12/1955 | Vodonik . |
| 2,840,541 | 6/1958 | Pezzaglia . |
| 2,986,551 | 5/1961 | Griffin et al. . |
| 3,069,434 | 12/1962 | Spence et al. . |
| 3,129,232 | 4/1964 | Terford et al. . |
| 3,221,032 | 11/1965 | Price et al. . |
| 3,251,657 | 5/1966 | Bachmann et al. . |
| 3,639,652 | 2/1972 | Mommaerts et al. . |
| 3,849,451 | 11/1974 | Stein et al. ............... 549/529 |
| 3,876,615 | 4/1975 | Usrgio et al. ............ 549/517 |
| 3,927,983 | 12/1975 | Gordon et al. . |
| 4,008,133 | 2/1977 | Gebeom et al. . |
| 4,017,523 | 4/1977 | Vargiu . |
| 4,099,926 | 7/1978 | Gutlhuber . |
| 4,132,718 | 1/1979 | Vargio et al. ............ 549/517 |
| 4,284,573 | 8/1981 | Arnett et al. ............ 549/517 |
| 4,289,895 | 9/1981 | Burkhardt et al. . |
| 4,313,886 | 2/1982 | Massingill . |
| 4,370,470 | 1/1983 | Vidaurri et al. . |
| 4,452,760 | 6/1984 | Peterson et al. . |
| 4,496,753 | 1/1985 | Kwon et al. . |
| 4,751,280 | 6/1988 | Pham et al. . |
| 4,877,857 | 10/1989 | Shirtum et al. ............ 549/517 |
| 5,245,057 | 9/1993 | Shirtum .................... 549/517 |

FOREIGN PATENT DOCUMENTS

| | | |
|---|---|---|
| 2032174 | 12/1990 | Canada . |
| 210447 | 1/1982 | Czechoslovakia . |
| 212856 | 12/1983 | Czechoslovakia . |
| 0264760 | 4/1988 | European Pat. Off. . |
| 0434124 | 6/1991 | European Pat. Off. . |
| 1091568 | 10/1960 | Fed. Rep. of Germany . |
| 2745150 | 6/1978 | Fed. Rep. of Germany . |
| 2909706 | 10/1980 | Fed. Rep. of Germany . |
| 1361063 | 4/1964 | France . |
| 213226 | 9/1984 | German Democratic Rep. . |
| 218767 | 2/1985 | German Democratic Rep. . |
| 2095679 | 10/1982 | United Kingdom . |

Primary Examiner—Joseph E. Evans

[57] ABSTRACT

A vertical reactor system having a plurality of substantially vertically aligned reaction compartments one on top of the other, the reactant materials (and catalyst and solvent, if desired), flowable from a first top compartment through intermediate compartments, if any, to a bottom compartment from which a desired product of a reaction of the reactant materials is withdrawn, the compartments having inlets for the addition of additional reactants, catalysts, or solvents and outlets for withdrawing by-products, vapors, and water from any compartment, and processes for producing products using such a system. In one embodiment the product is a liquid epoxy resin. Stirring impellers may be provided in any compartment. A liquid seal may be provided on a shaft for the impellers and, in one embodiment the seals in each compartment may be elevated above the liquid in the compartments.

12 Claims, 2 Drawing Sheets

VERTICAL CONTINUOUS REACTOR AND PROCESS FOR LIQUID EPOXY RESIN

CROSS REFERENCE TO RELATED APPLICATION

This is a divisional of application Ser. No., 07/643,877 filed Jan. 18, 1991, now abandoned.

BACKGROUND OF THE INVENTION

1. Field of the Invention

This invention relates to vertical continuous reactors; method of their use; and in one aspect to methods and apparatuses for producing epoxy resins, particularly a vertical continuous epoxy resin reactor and processes using it for producing epoxy resins.

2. Background of the Invention

Epoxy resins' superior toughness, chemical resistance, heat resistance, adhesion and electrical properties have contributed to their wide use in electrical and structural applications and in protective coatings. An epoxy group (1,2-epoxide or oxirane), a three-membered cyclic ether group, characterizes the epoxy resins. A curing agent reacts with these monomers or prepolymers to produce high performance thermosetting plastics.

A common form of epoxy resins are produced by well known processes such as the reaction of dihydric phenols and epihalohydrin. In one such process the epihalohydrin and dihydric phenol react in the presence of a catalyst to produce a halohydrin-containing resin intermediate which is then reacted with a basic acting material, e.g. sodium hydroxide. Treatment of the resulting reaction mixture, such as by water-washing, removes residual catalyst and salt, producing a liquid epoxy resin.

Various dihydric phenols are employed; e.g. hydroquinone, resorcinol, catechol, and bisphenols. Suitable epihalohydrins which can be employed herein include, for example, epichlorohydrin, epibromohydrin, epiiodohydrin, methylepichlorohydrin, methylepibromohydrin, methyiepiiodohydrin, mixtures thereof and the like. Suitable catalysts include, for example, quaternary ammonium compounds, quaternary phosphonium compounds, sulfonium compounds and the like.

Suitable quaternary ammonium catalysts include, for example, tetramethyl ammonium chloride, benzyl trimethyl ammonium chloride, triethanol ammonium chloride, tetraethanol ammonium hydroxide, dodecyl dimethylbenzyl ammonium naphthenate and the like. Suitable quaternary phosphonium catalysts include, for example, those quaternary phosphonium compounds disclosed in U.S. Pat. Nos. 3,948,855, 3,477,990 and 3,341,580 and Canadian 858,648 all of which are incorporated herein by reference. Other catalysts are ethyl triphenyl phosphonium iodide, ethyl triphenyl phosphonium bicarbonate, ethyl triphenyl phosphonium acetate.acetic acid complex, benzyl triphenyl phosphonium chloride, tetrabutyl phosphonium chloride, benzyl trimethyl ammonium chloride mixtures thereof and the like. Suitable sulfonium catalysts include thiourea catalysts such as, for example, tetramethyl thiourea; N,N'-dimethyl thiourea; N,N'-diphenyl thiourea; mixtures thereof and the like as well as thiodiethanon and other sulfonium precursors.

Also suitable as catalysts are the basic ion exchange resins such as, for example, DOWEX MSA-1, DOWEX 11, DOWEX SBR, mixtures thereof and the like.

Specific processes for producing epoxy resins are described in these U.S. Pat. Nos.; 4,313,886; 2,986,551; 3,069,434; 2,840,541; 3,221,032; 4,017,523; 4,751,280; and 4,008,133; and in various foreign references, including Great Britain 2,095,679; West Germany 2,909,706 and 2,745,150; East Germany 218,767 and 213,226; and Czechoslovakia 212,856 and 210,447. Known processes for producing liquid epoxy resins from bisphenol-A and ephichlorohydrin are either continuous or discontinuous processing operating in the presences of an alkali metal hydroxide in quantities of 2 moles, or about 2 moles, for every mole of bisphenol-A.

In a typical discontinuous process, a concentrated aqueous solution of alkali metal hydroxide is fed to a solution of bisphenol-A in epichlorohydrin at atmospheric or slightly lower than atmospheric pressure. The temperature is controlled to continuously distill the water introduced with the alkali metal hydroxide as an azeotropic mixture with the epichlorohydrin. After completion of the addition of the solution of alkali metal hydroxide, all the water is removed, the unreacted epichlorohydrin is recovered by distillation at pressures lower than atmospheric, and the alkali metal chloride, a sub-product of the reaction is separated by dissolving in water. Liquid epoxy resins obtained in such a process have a high viscosity, an undesirable color, and because of their relatively high chlorine content, are not suitable for various applications. Liquid epoxy resins made this way can have a residual chlorine content of the order of 0.5–0.8% by weight.

Several method of producing liquid epoxy resins by a continuous process, by effecting the reaction of the bisphenol-A with the epichlorohydrin in a number of individual reactors installed in series are well known in the art. In such processes, the bisphenol-A and the epichlorohydrin are continuously fed to a first reactor, while the alkali metal hydroxide in aqueous solution is introduced into each reactor up to a maximum quantity equal, or about equal to 2 moles for every mole of bisphenol-A. The reaction products are discharged continuously from the last reactor and are subjected to decantation to separate the liquid epoxy resin from the water and the alkali metal chloride which is a sub-product of the reaction.

In various conventional processes, the reaction is carried out in the presence of oxygenated organic substances of alcoholic or ketonic nature. The presence of extraneous substances in these procedures can cause a decrease in the purity of the resin produced, and the reactive substances such as the alcohols or the ketones can give rise to secondary reactions with formation of various sub-products. The added substances are eventually separated from the liquid epoxy resin, and are purified before recycling them to the reaction. The liquid epoxy resin is separated from the water and the alkali metal halide which is a sub-product of the reaction.

The difficulty and the lack of spontaneity in the separation of liquid epoxy compounds from water or aqueous saline solutions, is well known. To facilitate this separation, substances capable of varying the interface tension or the density have been used in the art; but the addition of extraneous substances to the system causes a decrease in the purity of the resin and the removal of these substances often proves to be very difficult. However, when operating without these extraneous substances, lengthy periods of decantation at elevated temperature are necessary causing undesirable secondary reactions.

Other processes in which an efficient reactor system would be useful include processes for producing epihalohydrins and other chemistries requiring rapid separation of a vapor product from a liquid reaction media or a vapor by-product from a liquid reaction product.

There has long been a need for an effective and efficient continuous vertical reactor and methods of its use. There has long been a need for an effective and efficient continuous process for producing liquid epoxy resins. There has long been a need for apparatus for use in such a process. There has long been a need for a continuous process for the production of liquid epoxy resins in which reaction by-products may be removed at various stages in the process. There has long been a need for a continuous process for the production of liquid epoxy resins in which catalysts and reactants can be added in a staged manner to minimize yield losses to undesirable side reactions.

SUMMARY OF THE PRESENT INVENTION the present invention provides processes and apparatuses for the effective continuous production of reactant products, e.g., but not limited to, liquid epoxy resins. In one embodiment of the present invention, a vertical continuous flow-through reactor system is provided with a plurality of compartments one on top of the other. Reactants flow into a first top compartment where reaction is initiated then by gravity through downcomers into intermediate compartments. Additional reactants or catalyst or both may be added to any or all of the intermediate compartments. The reaction may be allowed to proceed in the intermediate compartments without the addition of more reactants to insure complete reaction of the reactants. Liquid epoxy resins are discharged or withdrawn from a bottom compartment.

In one embodiment epihalohydrin and an active hydrogen containing species are fed into an initial compartment and reacted with an alkali hydroxide to form a glycidyl ether of the active hydrogen containing species. An organic cosolvent may be added to enhance the solubility of the alkali salt of the active hydrogen containing species in the organic phase. By-product water formed in the reaction is codistilled with solvent and a codistillate (of e.g. epichlorohydrin, solvent and water) is removed to maintain a desired concentration of water in the compartment. The feed rate of the epihalohydrin and active hydrogen containing species and the compartment size affect the extent of the reaction, i.e., the residence time.

Additional alkali hydroxide can be added to compartments below the top compartment for further reaction. Additional compartments are used to insure sufficient time for the reaction of the hydroxide. These additional compartments, or "digestion stages" need not have any catalyst added into them and the residence time in the additional digestion stages may be varied depending on the desired conversion of product being produced.

Vapor or by-products may be removed from any or all compartments simultaneously by appropriate nozzles and outlets. Mixing impellers can be provided in any compartment and in one embodiment are provided in each compartment. By-product and water removal minimize yield losses to unwanted side reactions as does the co-addition of catalyst and reactant alkali hydroxide.

In order to prevent liquid leaking between stages, a liquid tight seal may be used around the stirring shaft. The liquid seal may also be a bearing or bushing for shaft support. One problem with this type of seal in epoxy resin manufacture is the abrasive nature of the by-product salt. With this type of seal, the salt will migrate into the space between the shaft and bushing or bearing and erode one of the mating surfaces. The erosion will, with time, cause leakage between compartments and destroy the reaction residence time on the affected stage. One method for eliminating this erosion problem is to elevate the seal above the liquid by means of a stand pipe. In one embodiment it is preferred that the height of the stand pipes be greater than the height of the downcomers carrying the liquid phase to the next lower reaction stage.

It is, therefore, an object of the present invention, to provide new, unique, efficient, effective, and nonobvious processes and apparatuses for the continuous production of reactant products, e.g., but not limited to liquid epoxy resins.

Another object of the present invention is the provision of such processes in which a multi-compartment vertical reactor system is employed.

Yet another object of the present invention is the provision of such a process and apparatus in which vapor containing reaction by-products, e.g. water, may be removed from some or all of the compartments, simultaneously if desired.

An additional object of the present invention is the provision of such processes and apparatus in which catalyst and reactants can be added in a staged manner to any compartment to minimize yield losses.

A further object of the present invention is the provision of such a process and apparatus in which additional digestion stages are provided to insure sufficient time for the reaction, the residence times in these stages variable as desired.

The present invention recognizes and addresses the previously-mentioned long-felt needs and provides a satisfactory meeting of those needs in its various possible embodiments. To one of skill in this art who has the benefits of this invention's teachings and disclosures, other and further objects and advantages will be clear, as well as others inherent therein, from the following description of presently-preferred embodiments, given for the purpose of disclosure, when taken in conjunction with the accompanying drawings. Although these descriptions are detailed to insure adequacy and aid understanding, this is not intended to prejudice that purpose of a patent which is to claim an invention no matter how others may later disguise it by variations in form or additions or further improvements.

DESCRIPTION OF THE DRAWINGS

So that the manner in which the above-recited features, advantages and objects of the invention, as well as others which will become clear, are attained and can be understood in detail, more particular description of the invention briefly summarized above may be had by reference to certain embodiments thereof which are illustrated in the appended drawings, which drawings form a part of this specification. It is to be noted, however, that the appended drawings illustrate preferred embodiments of the invention and are therefore not to be considered limiting of its scope, for the invention may admit to other equally effective equivalent embodiments.

DESCRIPTION OF PREFERRED EMBODIMENTS

Figure 1:
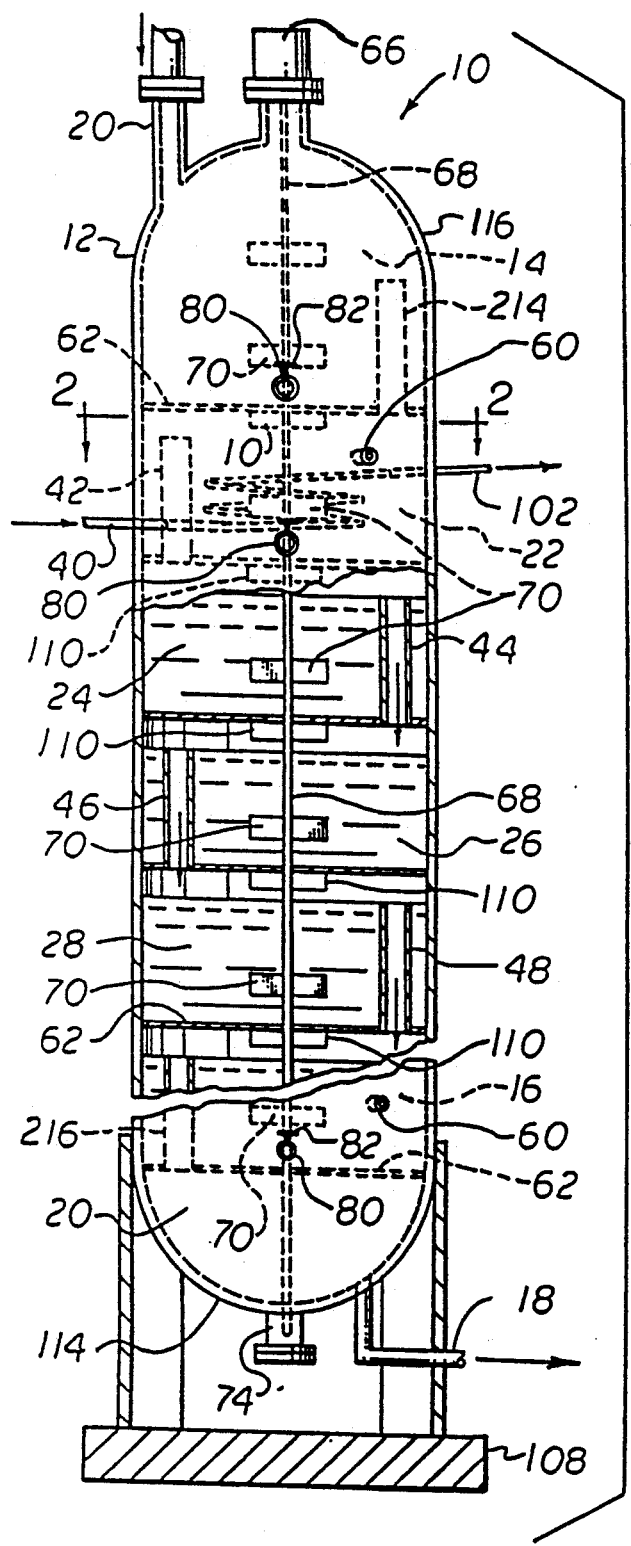
FIG. 1 is a side schematic view in cross-section of a vertical reactor system according to the present invention.

As shown in FIG. 1, a vertical reactor system 10 according to the present invention has a vessel 12 secured to a support flange 108, the vessel having a top feed inlet 20 for introducing reactant materials and a bottom discharge 18 for withdrawing products of the reaction of the reactant materials. The bottom head of the vessel is indicated by numeral 114 and the top head by 116.

A plurality of reaction compartments are substantially vertically aligned one on top of the other in the vessel 12, including a top compartment 14, a bottom compartment 16, and intermediate compartments 22, 24, 26, 30, 32, 34 and 36. Each compartment is defined by the sides of the vessel 12 and stage plates 62 has a downcomer through which materials flow into the next adjacent lower compartment, including downcomers 214 (for flow from the top compartment 14 to the next lower adjacent compartment 22); downcomers 42, 44, 46, 48, 50, 52, 54, 56; and downcomer 216 in the bottom compartment 16 through which materials including reaction products flow into a collection area 120 for discharge through bottom discharge 18.

Figure 3:
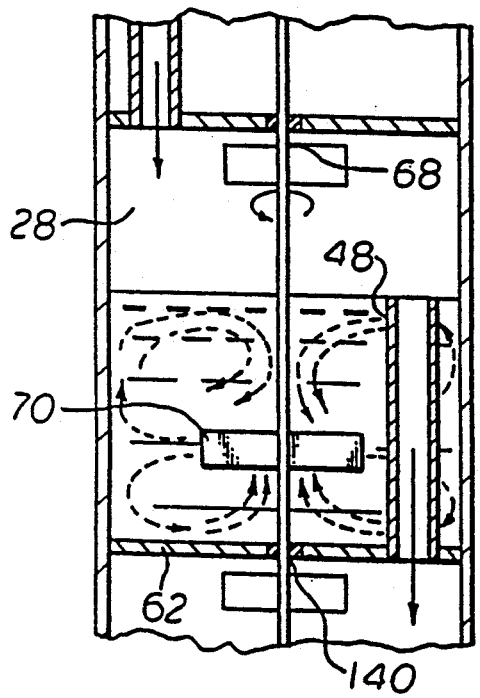
FIG. 3 is a schematic view of flow in an apparatus according to this invention.

Any compartment may have an impeller for facilitating reactant material mixing and the reaction of reactant materials to produce reaction products; but it is preferred that each compartment have a mixing impeller. As shown in FIG. 1, each compartment has an impeller 70 mounted on a common shaft 68 which extends through the vessel 12 from top to bottom and has its bottom end housed in a bearing 74. A stirring motor 66 mounted on the top of the vessel 12 is connected to and rotates the shaft 68 and its connected impellers 70. The impellers 70 induce a radial component to the flow of materials in the compartments as shown in FIG. 3 in compartment 28. Such flow is desired because it has a velocity component directed through required cooling-/heating coils to enhance transfer of heat and rapidly disperse catalyst or reactants.

For various other types of processes, different stirrers or impellers may be preferable; e.g. in a process in which high shear and high emulsification is desired a turbine impeller may be used and in a process that is shear sensitive a marine impeller may be used.

Any compartment may have a vapor outlet nozzle, but it is preferred, as shown in FIG. 1 that each compartment have a vapor outlet nozzle 110. Vapor and vapor containing reaction products, by-products, or sub-products can be withdrawn through the vapor outlet nozzles on each compartment.

Figure 2:
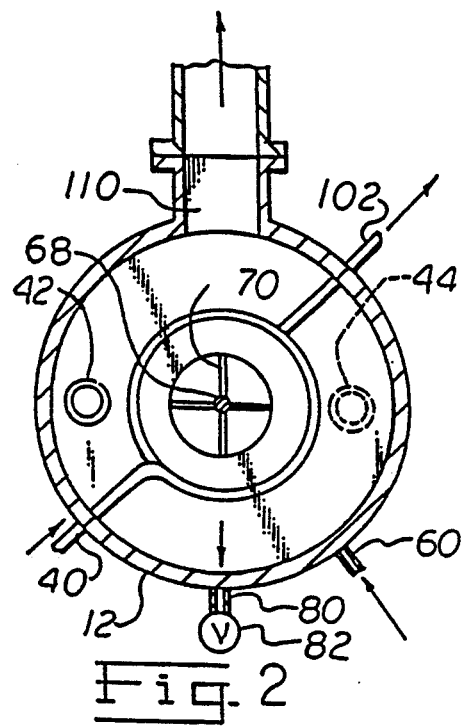
FIG. 2 is a view along line 2—2 of FIG. 1.

As shown in FIG. 2, each compartment may have (and it is preferred that every compartment have) a vapor outlet 110 (one shown for compartment 24); a steam inlet 40 and a steam outlet 102 (one each shown for compartment 24); a drain 80 and a drain valve 82 (one shown for compartment 24); and an additional reactant or catalyst feed inlet 60 (one shown for compartment 24). The drains 80 may serve as sample points.

The reactor system 10 is preferably used to produce liquid epoxy resins and: epihalohydrins, for example, from the reaction between 1,3-dihalo-2-propanol and-/or 2, 3-dihalo-1-propanol and sodium hydroxide (the epihalohydrin being removed in vapor). Reactant materials, e.g. an excess of epihalohydrin and an active hydrogen-containing species (e.g. bisphenol A) are fed into the top compartment 14 through top feed inlet 20. Through an additional reactant feed inlet 60, catalyst and an alkali hydroxide (e.g. NaOH) is fed into the compartment. In the ensuing reaction, a glycidyl ether of the active hydrogen-containing species is formed along with various by-products and sub-products including water and alkali salts.

The liquid reaction products, e.g. The liquid epoxy resin, reach a liquid level at the top of the downcomer 214 and flow by gravity through the downcomer 214 into the compartment 22 beneath the compartment 14. The extent of the reaction in the compartments (i.e., the residence time) is affected by reactant feed rate, catalyst feed rate, downcomer height, and compartment size.

Figure 5A:
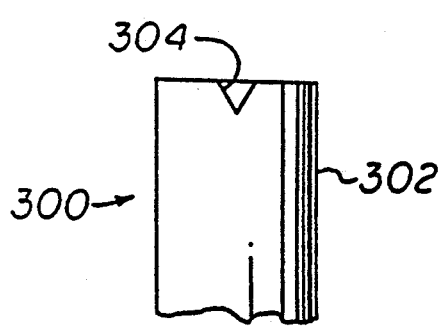
FIG. 5A and 5B are side views of downcomers according to this invention.
Figure 5B:
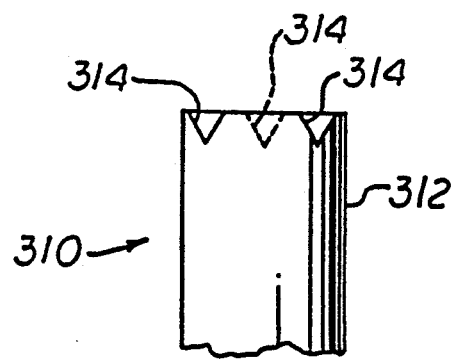

In order to reduce the possibility of solid salt accumulating around the top rim of the downcomer forming a dam which will retard the flow, a notch is provided in the downcomer rim to increase the flow velocity of the resin, salt and solvent mixture. If the production rates are increased, then rather than deepening the notch, a multiple number of notches are provided. These notches are illustrated in FIG. 5A and 5B. As shown in FIG. 5A, a downcomer 300 has a body 302 with a notch 304 in the top edge thereof. As shown in FIG. 5B, a downcomer 310 has a body 312 with notches 314 in the top edge thereof.

To enhance the solubility of an alkali salt by-product of the active hydrogen containing species in the organic phase, an organic co-solvent (e.g. secondary alcohols, diethers, etc.) may be used, introduced into the vessel with the reactant feed. By-product water formed in the reaction is co-distilled with this solvent and removed via the outlets 110 to maintain the desired concentration of water in the compartments. Additional reactants, catalyst (e.g. NaOH), or both can be fed through the additional reactant or catalyst inlet 60 in each compartment. For example, in one process according to the present invention a process is provided for the continuous preparation of liquid epoxy resins which includes contacting bisphenol A, epichlorohydrin and sodium hydroxide in a top compartment of a vertical reactor system as described herein; flowing reaction product and by-products of reaction of the bisphenol A, epichlorohydrin, and sodium hydroxide from the top compartment to at least one more compartment and adding additional sodium hydroxide (or sodium hydroxide and either besphenol A, epichlorohydrin or both) to the one more compartment; agitating the reactant materials in the compartments with an impeller rotatably mounted in the at least one more compartment; (in one embodiment the impeller inducing radial flow of the reactant materials); introducing a solvent into the system and removing by product water from each compartment in a codistillate of the epichlorohydrin, solvent and water; withdrawing vapor reaction products from each of the compartments; and withdrawing diglycidyl ethers of dihydric phenols from a lower portion of the reactor system.

Figure 4:
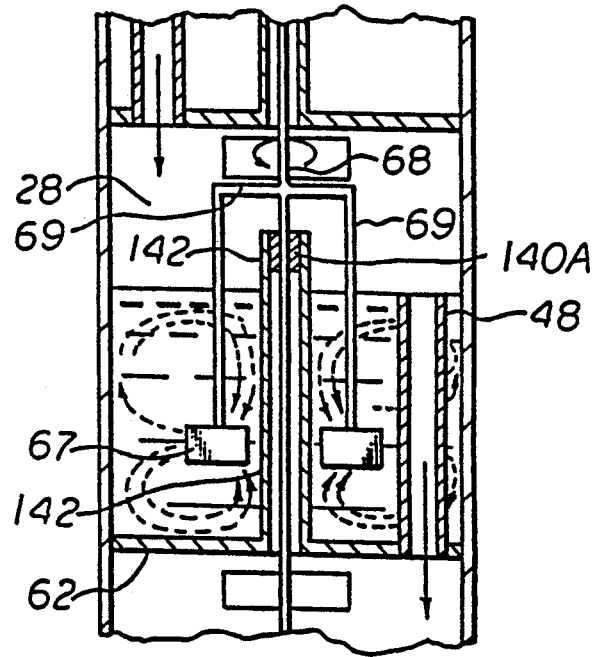
FIG. 4 is a schematic view of flow in an apparatus according to this invention.

As shown in FIG. 3 mixing lines for the radial flow impeller 70 (shown by arrows) indicate circulation in the intermediate compartment 28. The shaft 68 has a liquid seal 140 which minimizes leakage between adjacent compartments. As shown in FIG. 4, a preferred liquid seal 140A is elevated above the liquid contents of the compartment 28 and above the top edge of the downcomer 48. An elevated stand pipe 142 serves as a mount for the seal 140A and also isolates the shaft 68 from the compartment's liquid contents. The stand pipe 142 which is secured to the stage plate 62 can be either open or sealed. To accommodate the liquid seal 140A, a support 69 extends from and is secured to the shaft 68 to which are connected impeller blades 67 which rotate without contacting the stand pipe 142 creating a liquid circulation pattern (shown by arrows) like that in FIG. 3.

"Digestion stages"—compartments into which no additional reactants are fed—may be employed to insure that all the alkali hydroxide has been reacted. Residence time in the digestion stages may be varied as desired. The co-addition of catalyst and reactant alkali hydroxide in a staged manner helps to minimize yield losses to unwanted side reactions, as does by-product water removed in the vapors.

Preferred embodiments of a reactor according to the present invention may be used in processes for producing liquid epoxy resins in which: the preferred temperatures range between about 40° C. and about 100° C.; with pressures ranging between about 50 mm Hg and atmospheric pressure; water concentrations ranging between a about 0.2 weight percent and about 6 weight percent (which is below the saturation limit of the liquid phase in the reactor), with an amount equal to or less than 2 percent preferred; and bisphenol conversion rates ranging between about 50% (e.g. for producing high molecular weight, low chloride content epoxy resins) and up to almost 100%.

In conclusion, therefore, it is seen that the present invention and the embodiments disclosed herein are well adapted to carry out the objectives and obtain the ends set forth at the outset. Certain changes can be made in the method and apparatus without departing from the spirit and the scope of this invention. It is realized that changes are possible and it is further intended that each element or step recited in any of the following claims is to be understood as referring to all equivalent elements or steps for accomplishing substantially the same results in substantially the same or equivalent manner. It is intended to cover the invention broadly in whatever form its principles may be utilized. The present invention is, therefore, well adapted to carry out the objects and obtain the ends and advantages mentioned, as well as others inherent therein.

What is claimed is:

1. A process for the continuous preparation of reaction product of the reaction of reactant materials, the process comprising contacting the reactant materials for producing the reaction product in a top compartment of a vertical reactor apparatus, flowing reaction product and by-products of the reaction from the top compartment of the reactor apparatus to at least one more compartment of the reactor apparatus and adding additional reactant materials to each of the at least one more compartment for further reaction, agitating the reactant materials in each compartment, withdrawing vapor reaction products from each of the at least one compartment, and withdrawing the reaction product from a lower part of the reactor apparatus;

and wherein said vertical reactor apparatus comprises a vessel into which reactant materials for producing the reaction product flow and from which the reaction product and byproducts are withdrawn, the vessel divided by a plurality of plates into a plurality of intercommunicating compartments in substantially vertical alignment, including at least a top and a bottom compartment each compartment having a top plate and a bottom plate, the reactant materials flowable from the top compartment, through intermediate compartments, if any, and thence to the bottom compartment said compartments having a vapor outlet for discharging vapor reaction products resulting from reactions in the compartments, said compartments having a reactant inlet for introducing reactant materials into the compartments, stirring means in at least one of the said compartments for agitating the reactant materials therein, the vessel having inlet means through which reactant materials are introduced into the top compartment, the bottom compartment having discharge means through which the reaction product is withdrawn, the stirring means comprising a rotatable shaft extending through the at least one compartment, the shaft extending sealingly through the compartment's bottom plate and top plate, a motor connected to the shaft exteriorly of the vessel for rotating the shaft and an impeller mounted on the shaft in the at least one compartment.

2. The process of claim 1 wherein the reaction product is diglycidyl ethers of dihydric phenols and said vertical reactor includes a liquid-tight seal about the rotatable shaft in the at least one compartment in which the impeller is mounted minimizing leakage from the at least one compartment.

3. The process of claim 2 wherein the reactant materials are bisphenol A, epichlorohydrin, and an alkali metal hydroxide and wherein in said vertical reactor apparatus the liquid-tight seal is disposed above the liquid in the at least one compartment and the impeller is spaced apart from the liquid-tight seal and wherein at least one catalyst inlet is provided in the vessel for feeding catalyst into the top compartment and also includes a solvent inlet for feeding a solvent into the first compartment.

4. The process of claim 3 wherein a solvent is introduced into the vessel and by-product water is removed from each compartment in a codistillate of the epichlorohydrin, solvent and water and wherein said vertical reactor apparatus includes a solvent inlet for feeding solvent into each compartment.

5. The process of claim 4 wherein water concentration in the reactor system is maintained within a range of from about 0.2% to about 6% weight percent.

6. The process of claim 5 wherein the water concentration is maintained equal to or less than 2% weight percent.

7. The process of claim 1 wherein the temperature in the reactor system is between about 40° C. and about 100° C.

8. The process of claim 1 wherein the pressure in the reactor system is between about 50mm Hg and atmospheric pressure.

9. A process for the continuous preparation of liquid epoxy resins which comprises contacting reactant materials for producing the liquid epoxy resins in a top compartment of a vertical reactor apparatus, flowing reaction product and by-products of reaction of the reactant materials from the top compartment of the reactor apparatus to at least one more compartment of the reactor system and adding additional catalyst or reactant materials or both to the at least one more compartment for further reaction.

withdrawing vapor reaction products from each of the compartments, and withdrawing the liquid epoxy resins from a lower portion of the reactor apparatus, said vertical reactor apparatus comprising a vessel into which reactant materials for producing the reaction product flow and from which the reaction product and byproducts are withdrawn, the vessel divided by a plurality of plates into a plurality of intercommunicating compartments in substantially vertical alignment, including at least a top and a bottom compartment, the reactant materials flowable from the top compartment, through intermediate compartments, if any, and thence to the bottom compartment, each intermediate compartment having a top plate and a bottom plate, said compartments having a vapor outlet for discharging vapor reaction products resulting from reactions in the compartment, said compartments having a reactant inlet for introducing reactant materials into the compartment, a catalyst inlet for introducing catalyst into the compartment and a solvent inlet for introducing a solvent into each compartment, stirring means in each of the said compartments, for agitating the reactant materials therein, the stirring means comprising a rotatable shaft extending through each intermediate compartment's top plate and bottom plate with a liquid-tight seal about the shaft in each intermediate compartment to inhibit liquid leakage between compartments, an impeller mounted to the rotatable shaft in each compartment, the vessel having inlet means through which reactant materials are introduced into the top compartment, and the bottom compartment having discharge means through which the reaction product is withdrawn.

10. A process for the continuous preparation of liquid epoxy resins which comprises contacting bisphenol A, epichlorohydrin and sodium hydroxide in a top compartment of a vertical reactor apparatus, flowing reaction product and by-products of reaction of the bisphenol A, epichlorohydrin and sodium hydroxide from the top compartment of the reactor apparatus to at least one more compartment of the reactor apparatus and adding additional sodium hydroxide or sodium hydroxide and either or both bisphenol A or epichlorohydrin to the at least one more compartment for further reaction, agitating the reactant materials in the compartments with an impeller rotatably mounted in the a least one more compartment, the impeller inducing radial flow of the reactant materials, introducing into the apparatus a solvent and removing by product water from each compartment in a codistillate of the solvent and water, withdrawing vapor reaction products from each of the compartments, and withdrawing diglycidyl ethers of dihydric phenols from a lower portion of the reactor apparatus and wherein said vertical reactor apparatus comprises a vessel into which reactant materials for producing the liquid epoxy resins flow and from which the resulting liquid epoxy resins and by-products are withdrawn, the vessel divided by a plurality of plates into a plurality of intercommunicating compartments in substantially vertical alignment, including at least a top and a bottom compartment, the reactant materials flowable from the top compartment, through intermediate compartments, if any, and thence to the bottom compartment, each intermediate compartment having a top plate and a bottom plate, said compartments having a vapor outlet for discharging vapor reaction products resulting from reactions in the compartment, said compartments having a reactant inlet for introducing reactant materials into the compartment, stirring means in each compartment for agitating the reactant materials therein, the stirring means comprising a rotatable shaft sealingly extending through the compartments, a motor connected to the shaft exteriorly of the vessel for rotating the shaft, and an impeller in each compartment secured to the shaft, the impeller inducing radial flow in the reactant materials, a liquid-tight seal above the shaft in each intermediate compartment to inhibit liquid leakage between compartments, the vessel having inlet means through which reactant materials are introduced into the top compartment, the bottom compartment having discharge means through which the liquid epoxy resins produced by the reactions in the compartments are withdrawn, a catalyst inlet communicating with each compartment for feeding catalyst into each compartment, and a solvent inlet communicating with each compartment for feeding a solvent into each compartment.

11. The process of claim 10 wherein liquid flows from one compartment into a next compartment underneath it through a downcomer mounted in the one compartment.

12. The process of claim 11 wherein the liquid-tight seal is disposed above a top end of the downcomer in each compartment to inhibit contact of the seal by liquid in the compartments.

* * * * *